(12) United States Patent
Grassi et al.

(10) Patent No.: US 10,604,869 B2
(45) Date of Patent: *Mar. 31, 2020

(54) METHOD FOR PRODUCING A SYNTHETIC YARN WITH HIGH MOISTURE REGAIN AND YARN OBTAINED

(71) Applicant: GOLDEN LADY COMPANY S.P.A., Castiglione delle Stiviere (IT)

(72) Inventors: Nerino Grassi, Castiglione delle Stiviere (IT); Mauro Zaltieri, Castelnuovo di Asola (IT)

(73) Assignee: GOLDEN LADY COMPANY S.P.A., Castiglione delle Stiviere (IT)

(*) Notice: Subject to any disclaimer, the term of this patent is extended or adjusted under 35 U.S.C. 154(b) by 384 days.

This patent is subject to a terminal disclaimer.

(21) Appl. No.: 14/902,730

(22) PCT Filed: Jul. 3, 2014

(86) PCT No.: PCT/IB2014/062833
§ 371 (c)(1),
(2) Date: Jan. 4, 2016

(87) PCT Pub. No.: WO2015/001515
PCT Pub. Date: Jan. 8, 2015

(65) Prior Publication Data
US 2016/0168759 A1   Jun. 16, 2016

(30) Foreign Application Priority Data

Jul. 4, 2013 (IT) .................. FI2013A0162

(51) Int. Cl.
*D01F 6/82* (2006.01)
*B29C 48/49* (2019.01)
(Continued)

(52) U.S. Cl.
CPC .............. *D01F 6/82* (2013.01); *B29C 48/285* (2019.02); *B29C 48/49* (2019.02); *C08G 69/40* (2013.01);
(Continued)

(58) Field of Classification Search
CPC ... D01F 6/60; D01F 6/605; D01F 6/80; D01F 6/805; D01F 6/90; D01F 6/905;
(Continued)

(56) References Cited

U.S. PATENT DOCUMENTS 3,454,534 A    7/1969  Crovatt
9,834,867 B2*  12/2017 Zaltieri .................... D01F 6/90
(Continued)

FOREIGN PATENT DOCUMENTS

EP     0 156 035 A2    10/1985
EP     0 484 952 A1    5/1992
(Continued)

OTHER PUBLICATIONS

Lofquist R A et al: "Hydrophilic Nylon for Improved Apparel Comfort", Textile Research Journal, Sage Publications, London, GB, vol. 55, No. 6, Jun. 1, 1985 (Jun. 1, 1985), pp. 325-333, XP000574841, ISSN: 0040-5175.

*Primary Examiner* — Vincent Tatesure
(74) *Attorney, Agent, or Firm* — McGlew and Tuttle, P.C.

(57) ABSTRACT

There is described a method for producing a synthetic yarn based on polyamide with high moisture regain capacity, comprising the steps of: reacting polyamide and polyetheramine having a molecular weight of at least 1500 to obtain a modified polyamide containing polyetheramine to increase the moisture regain of the polyamide; and generating a yarn from a molten mass of the modified polyamide.

51 Claims, 6 Drawing Sheets

(51) Int. Cl.
   *B29C 48/285*   (2019.01)
   *C08G 69/40*    (2006.01)
   *C08G 69/48*    (2006.01)
   *D01D 5/08*     (2006.01)
   *B29K 77/00*    (2006.01)
   *B29L 31/00*    (2006.01)

(52) U.S. Cl.
   CPC ............... *C08G 69/48* (2013.01); *D01D 5/08* (2013.01); *B29K 2077/00* (2013.01); *B29K 2995/0092* (2013.01); *B29L 2031/731* (2013.01); *D10B 2331/02* (2013.01); *D10B 2331/06* (2013.01); *D10B 2401/022* (2013.01)

(58) Field of Classification Search
   CPC ........... D01F 8/12; C08G 69/02–69/38; C08G 69/40; C08G 69/42; C08G 69/44; C08G 69/46; C08G 69/48; C08G 69/50; C08G 2650/50; D10B 2331/06
   USPC ....................................................... 428/221
   See application file for complete search history.

(56) References Cited

U.S. PATENT DOCUMENTS

| | | |
|---|---|---|
| 2004/0242788 A1 | 12/2004 | La Grande et al. |
| 2012/0065362 A1 | 3/2012 | Amey |

FOREIGN PATENT DOCUMENTS

| | | |
|---|---|---|
| EP | 0 544 249 A2 | 6/1993 |
| EP | 1 783 156 A1 | 5/2007 |
| JP | 48-038339 B1 | 11/1973 |
| WO | 2014/057364 A1 | 4/2014 |

\* cited by examiner

METHOD FOR PRODUCING A SYNTHETIC YARN WITH HIGH MOISTURE REGAIN AND YARN OBTAINED

TECHNICAL FIELD

The present invention relates to the field of production of textile articles and in particular production of knitted textiles, woven textiles, nonwoven textiles and any other textile product that uses yarns, filaments or fibers.

More in particular, the invention relates to improvements to methods for producing polyamide-based synthetic textile articles.

STATE OF THE ART

The production of synthetic fibers and yarns is a very important sector of the current polymer industry. Synthetic fibers and yarns are used to produce textiles for industrial uses, for example in the automotive and furnishing industry. Synthetic fibers are widely used also in the apparel sector, for example for producing knitted articles such as socks and pantyhose. Particularly widely used fibers in the textile sector are polyamide-based fibers, typically nylon 6 (hereinafter also "polyamide 6") and nylon 6,6 (hereinafter also "polyamide 6,6"). These fibers have considerable advantages also with respect to natural fibers, such as lower production costs, increased strength both during production and conversion, and in final use. Moreover, the production process of synthetic fibers is more environmentally friendly, as the environmental impact deriving from the production of synthetic fibers is lower with respect to the impact due to the production of fibers of natural origin. In particular, with respect to the production of fibers of natural origin, the production of synthetic fibers entails lower energy consumption and lower water consumption.

Nonetheless, synthetic fibers have some disadvantages with respect to natural fibers, in particular they are less pleasing to the touch, which in many cases leads the consumer to choose fibers of natural origin, in particular for those products in direct contact with the body.

Over the years, several attempts have been made to improve this aspect of synthetic fibers, in particular aimed at increasing their hydrophilicity, by increasing their moisture regain rate.

For example, some attempts have been made to incorporate polyether segments in polyamides with the aim of increasing the quality of the fibers or of the yarns obtained by extrusion of these polymers.

The desired property of hydrophilia in nylon (polyamides) yarns for use in the clothing sector is currently imparted through incorporation of oxyethylene groups (—OCH2CH2-) in the polyamide. Polyamides modified in this way can require changes in the polymerization conditions and can present problems in the extrusion and spinning step.

Therefore, there is a need to provide synthetic yarns or fibers with improved moisture regain capacities, which are easy to spin and subsequently convert for producing textile articles of various kinds.

SUMMARY OF THE INVENTION

The present invention relates to methods for producing synthetic fibers, yarns or filaments based on polyamide with high moisture regain capacity, i.e. high hydrophilic properties.

Within the context of the present description and of the appended claims the term "yarn" will be used frequently. This term is intended to designate a generic textile article that can comprise continuous or discontinuous yarns, i.e. staple fibers, or continuous yarns obtained by spinning fibers, i.e. discontinuous elements. The staple fibers can be obtained in turn from processing of continuous yarns obtained by extrusion.

The textile article can be a mono-filament or multi-filament, i.e. formed by one or more filaments.

The textile article can be mono-component, i.e. consisting of a single component that forms the whole cross section of the yarn. The textile article can also be multi-component, in particular bi-component, i.e. consisting of the combination of two different components, for example arranged one inside the other, with a core made of one component and the skin or outer layer made of a different component. The bi-component yarn can also comprise the two components placed side by side, rather than one inside the other.

Substantially, the method described herein for producing a synthetic yarn based on polyamide with high moisture regain capacity, comprises the steps of: reacting polyamide and polyetheramine having a molecular weight of at least 1500 to obtain a modified polyamide containing polyetheramine to increase the moisture regain of the polyamide; and generating a yarn from a molten mass of said modified polyamide. In practice, the modified polyamide has at least some carboxyl groups substituted with polyetheramine.

As will be described in greater detail below, the two steps of producing the modified polyamide and producing the yarn can be carried out separately, first producing a modified polyamide, optionally in chip form, and subsequently, in a different operating step, using the chips in a yarn extrusion and production process. In other embodiments, the two steps can be combined and carried out in a single system or plant, feeding polyamide and polyetheramine, optionally in combination with other components, to an extrusion system with a spinneret wherefrom one or more filaments for producing the synthetic yarn are generated.

The reaction can be facilitated by using one or more additives, such as a chain extender, a grafter, or the like. The reaction can take place in a separate production step. The modified polyamide can then be supplied to an extrusion process to be converted into mono- or multi-filament yarns, for example by melting the modified polyamide in chips and extruding the molten material through a suitable spinneret, with techniques substantially deriving from the technology for producing synthetic yarns for textile use.

It has been found that a modified polyamide with this structure has a degree of moisture regain, which is substantially higher than prior art polyamides. Mono- or multi-filament yarns, consisting at least partly of a modified polyamide obtained with the method described herein have a moisture regain comparable to or greater than yarns obtained with natural fibers, for example cotton, and technical, mechanical, dyeability and other characteristics such as to make it compatible with use for the production of textile articles, both in the field of apparel and in other fields, such as furnishing, automotive industry and the like.

In some embodiments, the method provides for contacting the polyamide and the polyetheramine directly in an extrusion device. The extrusion device can comprise one or more extruders in series. In this way, the two components react with one another during extrusion, obtaining at the exit from the extrusion device a yarn or a plurality of filaments of modified polyamide, produced from the reactions between the components.

The polyetheramine preferably has an AHEW (Amine Hydrogen Equivalent Weight) that does not exceed by more than 10% the idealized AHEW of the polyetheramine. The term (AHEW) is defined as the molecular weight of the polyetheramine divided by the number of active amine hydrogen per molecule. For example, an idealized polyetheramine, having an average molecular weight of 2000 and in which all the ends of the polyether were amine ends, hence contributing 4.0 active amine hydrogens per molecule, would have an AHEW of 500 g per equivalent. If 10% of the ends are hydroxyl rather than amine, there will be only 3.6 active amine hydrogens per molecule and the polyetheramine will have an AHEW of 556 g per equivalent.

The number of active amine hydrogens per molecule, and hence the AHEW of a given polyetheramine, can be calculated according to prior art and conventional techniques, for example by calculating the amine group nitrogen content using the procedure described by the standard ISO 9702.

In particularly advantageous embodiments, the polyetheramine is a polyetherdiamine, preferably having a molecular weight equal to or greater than 1500 and an AHEW that does not exceed by more than 10% the idealized AHEW for this polyetheramine.

The polyamide can in general be a dyeable acid (anionic) or base (cationic) polymer. In particularly advantageous embodiments the polyamide can, for example, be a nylon 6,6 (polyhexamethylene adipamide). In other embodiments the polyamide can be a nylon 6, i.e. poly(ε-caprolactame). In yet other embodiments the polyamide can be a copolymer of nylon 6 and nylon 6,6.

The polyamide can be metered into the extrusion device, for example, in chip form, as normally used in the production of nylon-based synthetic yarns. The polyetherdiamine can be metered in liquid form.

Advantageously, the amount of the aforesaid two components is metered so that the amount of polyamide is preferably comprised between 50% and 98% by weight. In other embodiments the percentage of polyamide can be comprised between 50% and 95% by weight, for example between 70% and 95% by weight. In advantageous embodiments, the percentage of polyamide is comprised between 85% and 93%. It must be understood that all the values within the intervals defined above and each sub-interval contained in the intervals defined above are included in the present disclosure.

Theoretically, if all of the polyamide reacts with the polyetheramine, analogous percentages will be found in the finished product. Deviations from the metering intervals indicated above in the end product can be determined by incomplete reaction of the polyetheramine or the formation of sub-products different than the modified polyamide.

In some embodiments the polyetheramine can be an alkyl polyetheramine.

In some embodiments the polyetheramine is a polyetherdiamine, such as the Elastamine® RE-2000 produced and marketed by Huntsman International LLC. This polyetherdiamine has an average molecular weight of 2000 and an AHEW of 505 g per equivalent, hence not exceeding by more than 10% the idealized AHEW, in this case of 500 g per equivalent.

According to some embodiments, the polyetherdiamine is a copolymer of propylene oxide and ethylene oxide with the following structure:

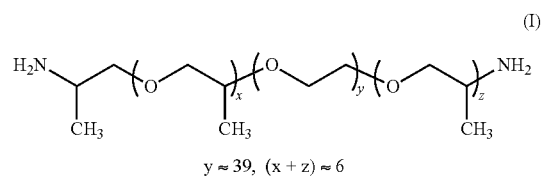

$y \approx 39$, $(x + z) \approx 6$ where y≈39 is the number of ethylene oxide molecules and x+z≈6 is the number of propylene oxide molecules.

In other embodiments the polyetheramine can be a copolymer of α,ω-diamine poly(oxyalkylene-co-oxyalkylene ether), for example of the type described in US 2012/0065362, the content of which is incorporated in the present disclosure.

Polyetheramine can have a molecular weight that depends, for example, on the desired properties to be obtained in the extruded polymer after the reaction between polyamide and polyetheramine. In some embodiments the molecular weight of the polyetheramine is 1500 or greater. In some embodiments the molecular weight of the polyetheramine can be equal to 1800, or equal to 2000. In other embodiments the molecular weight can be greater than 2000, for example equal to or greater than 2200, equal to or greater than 2500 and even up to at least 5000.

The amount of polyetheramine in the finished polymer, obtained by extrusion, can be comprised between 1% and the 30%, for example between 2% and 20%, preferably between 5% and 15% by weight, for example between 8% and 12%. It is understood that the present disclosure also comprises all the values within the intervals defined above and each sub-interval contained in the intervals defined above.

The polyamide usable in the method described can have a molecular weight, for example, comprised between 8,000 and 18,000. In some embodiments, the polyamide has a molecular weight comprised between 9,000 and 15,000, for example between 10,000 and 14,000 UMA.

In a possible embodiment, the polyamide can have a number of amine end groups ($NH_2$) equal to the number of carboxyl end groups (COOH), for example in both cases equal to 47.

According to some embodiments, the method described can use a polyamide with a number of amine end groups lower than the number of carboxyl end groups. In some embodiments the amount of amine end groups (AEG) is comprised between 5 and 60 meq/kg. In preferred embodiments the polyamide has an AEG below 55, advantageously comprised between 5 and 45 meq/kg. In some embodiments the polyamide is characterized by an AEG between 5 and 35. In some embodiments the number of carboxyl end groups (CEG) is comprised between 40 and 200 meq/kg. In some particularly advantageous embodiments a polyamide with CEG comprised between 80 and 100 is used.

The total number of end groups (TEG) is advantageously comprised between 5 and 155 meq/kg.

According to some embodiments, the polyamide can have a relative viscosity comprised between 2 and 3 and preferably between 2.2 and 2.8 (measured in 95.7% sulfuric acid).

As will be apparent below, a number of carboxyl end groups greater than the number of amine end groups can enable binding of a greater amount of polyetheramine molecules in the final polymer.

In advantageous embodiments, the reaction between polyetheramine and polyamide can take place at temperatures comprised between 220 and 350° C., in an optionally pressurized reaction container. If the reaction takes place directly in one or more extruders, these can develop internal temperatures comprised between the values indicated above in the areas in which contact and reaction between polyetheramine and polyamide take place.

The yarn obtained from extrusion of the polymer according to the method described herein can be a multifilament textile yarn of the LOY (low orientation yarn), POY (Partially Oriented Yarn), or FDY (Fully Drawn Yarn) type.

As mentioned, the filament can be continuous and used as such, or divided into staple fibers, for example of a length comprised between 10 and 100 mm The staple fibers can be converted into continuous yarns using known spinning processes.

According to a further aspect, the staple fibers can be used for producing nonwoven fabrics, forming fiber webs which are subsequently subjected to mechanical, hydraulic, chemical or thermal bonding processes, or combinations thereof.

The yarns can be used in weaving processes, knitting processes or for other uses.

Yarns produced with the procedure described herein can subsequently be processed to modify their physical and mechanical characteristics. In some embodiments, the yarns can be combined with other yarns to obtain composite articles. In some embodiments the yarns obtained from the spinneret can be texturized, or taslanized, stretched, combined with elastomeric yarns for example through an interlacing or covering jet, or other suitable devices.

As indicated above, the yarn can be mono-component. In this case the filament or filaments of which it is formed consist of the same material. In other embodiments, the yarn can be multi-component, for example bi-component. One, some or each filament forming the yarn comprises, in this case, two parts formed by two different polymers. In some embodiments the filament comprises an inner core and an outer coating ("core-skin" bi-component fiber) produced in different polymers. According to possible embodiments, the outer part, or skin, that surrounds the inner core can be produced with the polymer having high moisture regain containing polyamide and polyetheramine, while the core can be produced with a different polymer, for example a polyamide without polyetheramine molecules. In some embodiments a core of nylon 6 or nylon 6,6 can be extruded with a skin of polyamide and polyetheramine produced as described herein.

In some embodiments the bi-component fiber can have a second component consisting of or comprising thermoplastic polypropylene or polyurethane, or polyester, for example polyethylene terephthalate or polybutylene terephthalate.

In other embodiments the two components that form each filament can be arranged side by side with one another ("side-by-side" bi-component fiber), rather than inserted one inside the other.

Extrusion heads for producing multi-component fibers, in particular bi-component fibers, are known and can be used advantageously in the context of the present method.

In some embodiments, bi-component yarns can be produced in which from 10% to 95% by weight, preferably from 50% to 80% by weight, of the polymer of which they are composed is a polymer containing polyamide and polyetheramine, while the remaining part consists of polyamide, or a polymer of another kind, for example polypropylene.

In some embodiments the yarn is extruded with a number of filaments comprised between 1 and 300.

According to some embodiments, the yarn has a linear density comprised between 5 and 6000 dtex. In advantageous embodiments the yarn has a DPF (dtex per filament) value comprised between 0.5 and 20.

In some particularly advantageous embodiments, the yarn has a number of filaments comprised between 1 (single filament) and 100, preferably between 30 and 60 and a linear density comprised between 7 and 140 dtex, preferably between 40 and 60 dtex. In some embodiments the polymer is extruded at an extrusion speed between 20 and 80 cm/s. The filaments exiting from the spinneret can advantageously be cooled in a known manner, for example in a current of air.

In this step the single filaments are cooled with a lateral flow of air and made to converge toward and through an oiler to be thus combined to form a multi-filament yarn. Downstream the yarn can be fed around one or more stretching and/or relaxing and/or stabilizing rollers, motorized and controlled at peripheral speeds that can differ from one another to give the yarn the required and desired degree of stretch and/or orientation.

In some embodiments the yarn is subjected to elongation comprised between 20% and 60%.

Finally, the yarn is wound to form a reel or package. The winding speed can, for example, be comprised between 1,000 and 5,500 m/min.

Further advantageous characteristics and embodiments of the invention are described hereunder and are indicated in the appended claims, which form an integral part of the present description. The brief description provided above identifies characteristics of the various embodiments of the present invention so that the following detailed description can be better understood and so that the present contributions to the art may be better appreciated. Naturally, there are other characteristics of the invention which will be described below and will be set forth in the appended claims. With reference to this, before illustrating different embodiments of the invention in detail, it must be understood that the various embodiments of the invention are not limited in their application to the structural details and to the arrangements of components described in the following description or illustrated in the drawings. The invention can be implemented in other embodiments and implemented and put into practice in various ways. Moreover, it must be understood that the phraseology and terminology employed herein are purely for descriptive purposes and must not be considered limiting.

Therefore, those skilled in the art will understand that the concept on which the description is based can be readily used as a basis to design other structures, other methods and/or other systems to implement the various objects of the present invention. Consequently, it is important that the claims are considered as inclusive of those equivalent structures which do not depart from the spirit and from the scope of the present invention.

BRIEF DESCRIPTION OF THE DRAWINGS

The invention will be better understood by following the description and accompanying drawing, which shows a non-limiting practical embodiment of the unit according to the invention. More in particular, in the drawing.

DETAILED DESCRIPTION OF AN EMBODIMENT

The detailed description below of examples of embodiments refers to the accompanying drawings. The same reference numbers in different drawings identify identical or similar elements. Moreover, the drawings are not necessarily to scale. Further, the detailed description below does not limit the invention. Rather, the scope of the invention is defined by the appended claims.

Reference in the whole of the description to "an embodiment" or "the embodiment" or "some embodiments" means that a particular characteristic, structure or element described in relation to an embodiment is included in at least one embodiment of the subject matter described. Therefore, the phrase "in an embodiment" or "in the embodiment" or "in some embodiments" in various points throughout the description does not necessarily refer to the same embodiment or embodiments. Moreover, the particular characteristics, structures or elements can be combined in any suitable manner in one or more embodiments.

Figure 1:
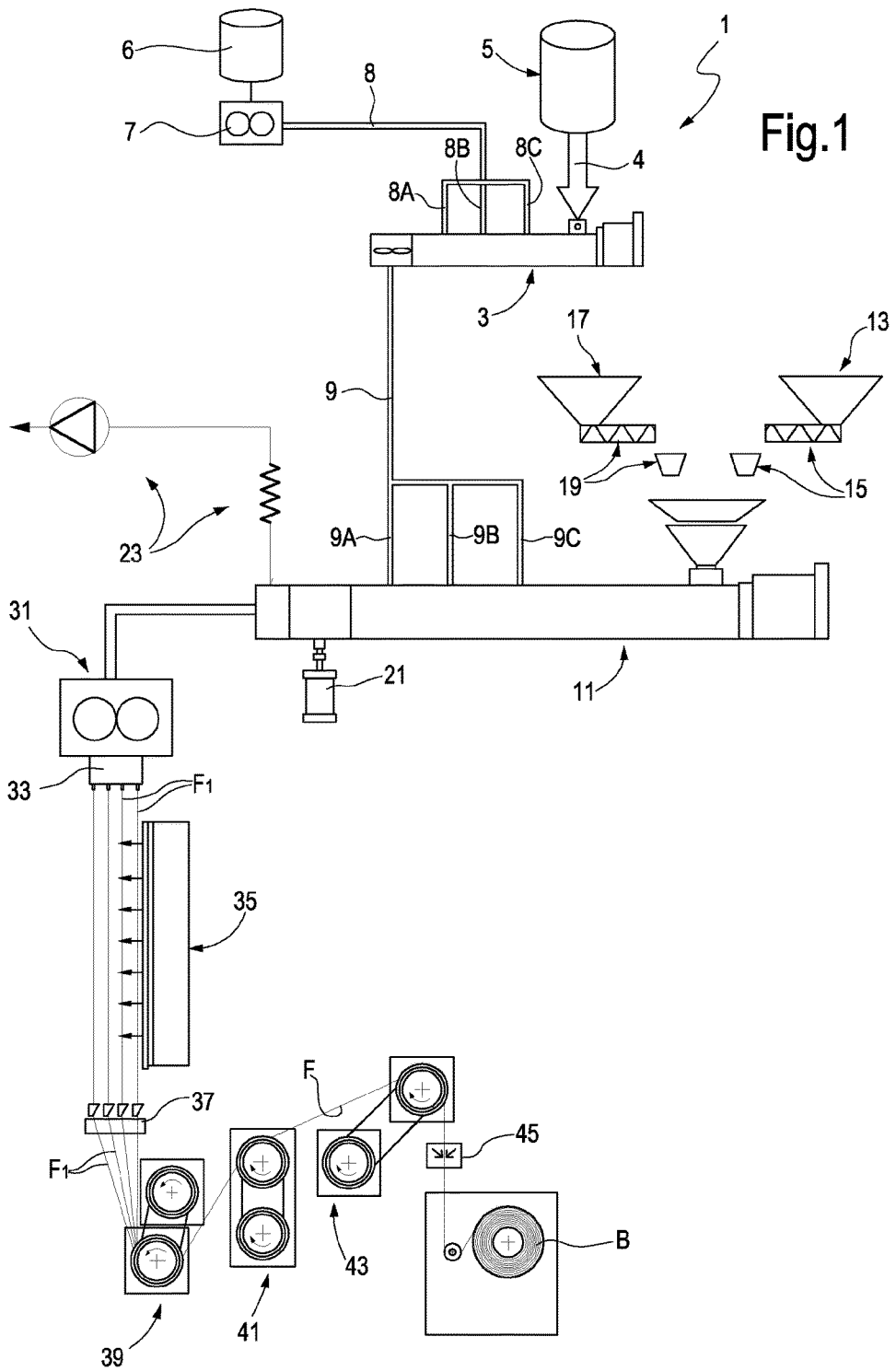
FIGS. 1 to 6 show diagrams of a system for production of a yarn with the method of the present description in six embodiments.

The diagram of FIG. 1 shows a system or device for producing a synthetic yarn according to an embodiment of the method of the present invention. Number 1 indicates the system as a whole. It comprises a first extruder 3 that is fed with a polymer coming from a tank 5 along a feed line 4.

The polymer can be a polyamide (nylon) 6,6, a polyamide 6, or another polymer as defined above. Hereinafter, the polymer fed in 4 is indicated simply as nylon or polyamide 6,6, it being understood that in other embodiments other polymers can be used.

In some embodiments the extruder 3 can comprise a single screw. In other embodiments a twin screw extruder 3 can be used.

A polyetheramine is fed along the feed path of the polymer, for example a polyetherdiamine of formula (I). The number 6 generically indicates a tank of the polyetheramine, which is metered via a pump 7 and fed along lines 8, 8A, 8B, 8C to the extruder.

Advantageously, the polyetherdiamine is injected into the extruder in an area downstream of the polymer feed point, with respect to the direction of feed of the polymer in the extruder. In some embodiments, the polyetheramine is injected in a single point of the extruder. In improved embodiments, the polyetheramine is injected into the extruder in a plurality of points or positions, arranged in sequence along the extrusion path. In this way, the polymer is at least partly dissolved before contacting the polyetheramine. The diagram of FIG. 1 indicates a system with three injection points of the polyetheramine into the extruder chamber, but it must be understood that this is only one possible exemplary embodiment and that the number of injection points of the polyetheramine can differ.

In the end area of the extruder 3 the polyamide is mixed with the polyetheramine.

The mixture obtained is fed to a second extruder 11 along a line 9. In some embodiments the mixture of polyetheramine and polyamide coming from the first extruder 3 is injected in one or preferably in a plurality of points or positions along the feed path of the second extruder, as represented schematically in 9A, 9B, 9C in FIG. 1. The number of injection points or positions of the polyamide and polyetheramine into the second extruder can be variable. In the example schematically represented there are provided three injection positions, but it must be understood that this is only one of the possible configurations of the system.

A further metered dose of polyamide is fed to the second extruder 11 from a second tank 13 via a metering system 15.

In some embodiments the polyamide fed from the tank 13 to the second extruder 11 is the same as the polyamide of the tank 5. In this case, there could be provided a single tank and optionally a double metering system to the two extruders 3, 11.

In other embodiments, the polyamide fed to the second extruder 11 is different from the polyamide fed to the first extruder 3. For example, the polyamide fed to the first extruder 3 can have a carboxyl end group to amine end group ratio greater than 1, preferably equal to or greater than 1.5, even more preferably greater than 1.8, for example around 2. Therefore, this polyamide has a greater number of carboxyl end groups than the number of amine end groups. In some embodiments the number of carboxyl end groups is comprised between 80 and 100 and the number of amine end groups is comprised between 40 and 50.

The polyamide fed to the first extruder 3 can have a viscosity comprised between 10 and 100 Pa*s. In some embodiments the polyamide fed to the extruder 3 can have a viscosity comprised between 15 and 70 Pa*s, and in particular between 20 and 50 Pa*s.

The viscosity (Pa*s) of the melt is measured with a capillary rheometer at a temperature of 290° C. and different speed gradients ($s^{-1}$) generally comprised between 10 and 10,000 $s^{-1}$.

The polyamide fed to the second extruder 11 can have a carboxyl end group to amine end group ratio of around 1. In some embodiments the polyamide fed to the second extruder 11 can have a number of carboxyl end groups and a number of amine end groups comprised between 30 and 60 meq/kg, for example between 40 and 50 meq/kg.

In some embodiments the viscosity of the polyamide fed to the second extruder 11 can be greater than the viscosity of the polyamide fed to the extruder 3. For example, the viscosity of the polyamide fed to the extruder 11 can be comprised between 30 and 150 Pa*s, preferably between 50 and 100 Pa*s.

In some embodiments, with the second extruder 11 there can be associated a container 17 of an additive, and a metering system 19, for metering the additive and mixing it in the extruder 11 with the polyamide coming from the tank 13. In some embodiments the two metering systems 19 and 15 respectively feed the additive and the polyamide into a hopper where they are mixed before being fed into the extruder 11.

The additive of the tank 17 can comprise a chain extender or a grafter for thermoplastic polymers and in particular for polyamides, adapted to react with carboxyl and amine groups. In some embodiments the additive can be a chain extender Joncryl® ADR-3400 produced by BASF. Others suitable additives can be Fusabond N493 produced by DuPont, Orgalloy R 6000-6600, produced by Athochem and Irgarod RA20 produced by Ciba Specialty Chemicals.

The extruder 11 can be equipped with a dynamic mixer 21 and with a degassing system 23, to eliminate steam that forms as a result of the chemical reaction inside the extruder 11, as will be explained in more detail below. The polymer obtained is fed via a pump 31 to a spinneret 33, with which filaments F are produced, collected in a yarn Y that is then wound in a reel B.

In some embodiments, the filaments F1 generated by the spinneret 33 are cooled in a cooling area 35, for example by means of jets of cold air. Downstream of the cooling area 35 oilers 37 can be provided, where through the filaments F1 pass before being collected to form a single yarn F.

Between the oilers 37 and the winding reel one or more godet rollers or pairs of godet rollers B can be arranged, to impart a certain degree of stretch to the yarn F. The diagram of FIG. 1 shows three godets 39, 41 and 43, each of which comprises a pair of rollers. The yarn follows a path along which it forms one or more turns about each pair of rollers forming the godet. The speed of the godet rollers is controlled so as to impart the required degree of stretch to the yarn, and consequently orient it as required.

In some embodiments the godets are controlled so as to generate a stretch not exceeding 10 and a take-up tension of the yarn not exceeding 0.5 g/DPF (DPF=dtex per filament). For example, in a yarn with linear density 54 dtex and 40 filaments, having a DPF of 1.35 (54/40=1.35) the winding tension is equal to or below 10 g.

The godets can have a gradually increasing feed speed. In some embodiments, using three godets as illustrated, the peripheral rotation speed can be increasing from 3,600 m/min for the godet 39, 3,800 m/min for the godet 41 and 4,000 m/min for the godet 43, which will be the same as the take-up speed on the reel B.

In some embodiments along the path of the yarn an interlacing jet 45 can be provided.

In a further embodiment, not shown, a polyetheramine, in particular, for example, a polyetherdiamine, and a grafter, and/or a chain extender or other additive that facilitates the reaction between polyetheramine and polyamide can be fed to the extruder 3. The additive can be fed to the extruder via a container or tank in place of the container 5. The position of the injection points of the grafter or other additive and of the polyetheramine can be inverted. The polyamide can be fed only to the second extruder 11. In further embodiments, a polyamide can also be fed to the first extruder, together with the polyetheramine and with the grafter or other additive.

In modified embodiments, polyetheramine and/or polyamide can be fed to the first extruder and/or to the second extruder, individually or in combination, without grafter, chain extender or other additive.

Figure 2:
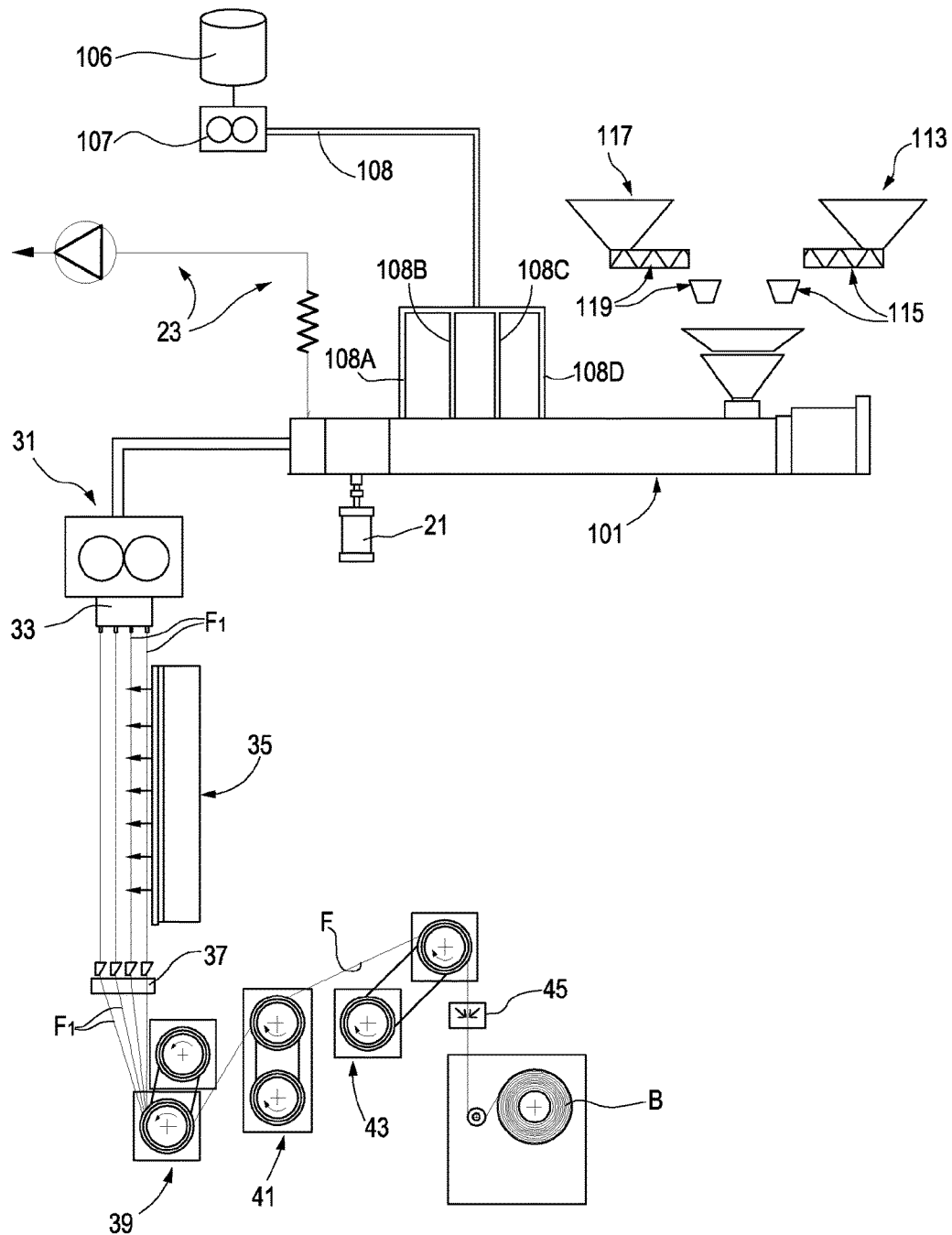

FIG. 2 schematically shows a second exemplary embodiment of a system for the production of a yarn according to the method described herein. The same reference numbers indicate the same or equivalent parts to those described with reference to FIG. 1 and shall not be described again. In this embodiment a single extruder 101 is provided. In some embodiments the extruder 101 can be a single-screw extruder. In other embodiments the extruder 101 can be a twin-screw extruder.

Polyamide delivered, for example, from a tank 113 is fed to the extruder 101. For example, the tank 113 can contain polyamide 6,6 or polyamide 6 in the form of chips. The polyamide can be fed to the extruder 101 via a metering system 115. In some embodiments a grafter, a chain extender, or other additional component that facilitates formation of the final polymer, is fed to the extruder 101. The grafter or other additive can be contained in a container or tank 117. A metering system 119 can be provided to feed the grafter or other additive to the extruder 101. In other embodiments the grafter can be omitted.

In some embodiments the system can comprise a tank 106 containing polyetheramine, which can be fed to the extruder 101, for example, via a pump 107. The polyetheramine is fed into the extruder chamber at one or more points or positions, preferably downstream of the feed-in point of the polyamide and of the grafter, if used. The embodiment illustrated shows, purely by way of example, four polyetheramine feed-in points or positions.

The degassing system, the spinneret and the system for cooling and taking-up the filaments and the yarn F formed with these filaments can be substantially similar to those described with reference to FIG. 1.

Figure 3:
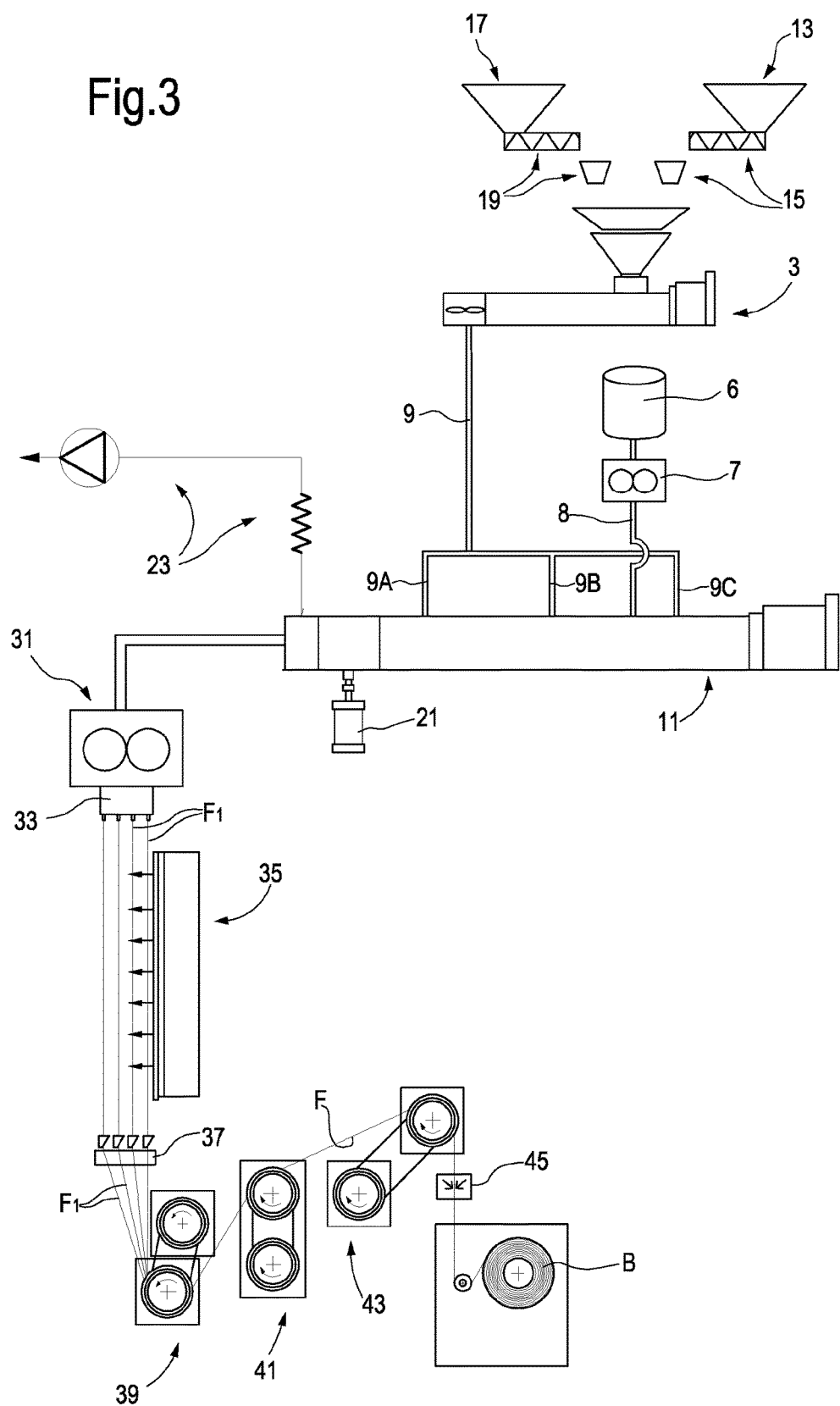

FIG. 3 shows a further embodiment of a system for implementation of the method described herein. The same reference numbers indicate the same or equivalent parts to those illustrated with reference to the embodiment of FIG. 1. In the example of FIG. 3 a first extruder 3 and a second extruder 11 in sequence or in cascade are provided, with an arrangement such that the polymer extruded from the extruder 3 is fed into the second extruder 11 in a plurality of feed-in points 9A, 9B, 9C.

With the first extruder 3 a container 17 can be associated, provided with a metering device 19 for metering an additive, for example a grafter or a chain extender, to the first extruder 3. The additive can be in granular or powder form and can be fed in combination with a polyamide granulate, for example polyamide 6 or polyamide 6,6 contained in a container 13, with which a metering system 15 is associated. In some embodiments, the polyamide coming from the container 13 and the additive coming from the container 17 are fed in a single point of the extruder 3. In other embodiments the two components can be fed in different points along the extrusion path defined by the screw or screws of the extruder 3.

The molten polymer in the extruder 3 is fed via the line 9 into the second extruder 11 in one or more points 9A, 9B, 9C. In some embodiments the polyetheramine can be metered to the second extruder 11. For example, the polyetheramine can be contained in a container 6 connected via a line 8 to the second extruder 11.

In some embodiments the polyetheramine can be fed in an intermediate position between sequential injection points of the polymer coming from the first extruder.

In other embodiments, not shown, the polyetheramine coming from the container 6 can be fed in more than one injection point along the extension of the second extruder.

In further embodiments the feed-in point or points of the polyetheramine coming from the container 6 can all be downstream with respect to one or more feed-in points of the molten polymer coming from the line 9.

The remaining components associated with the second extruder 11 correspond to those already described with reference to FIG. 1, are marked with the same reference numbers and will not be described again.

Figure 4:
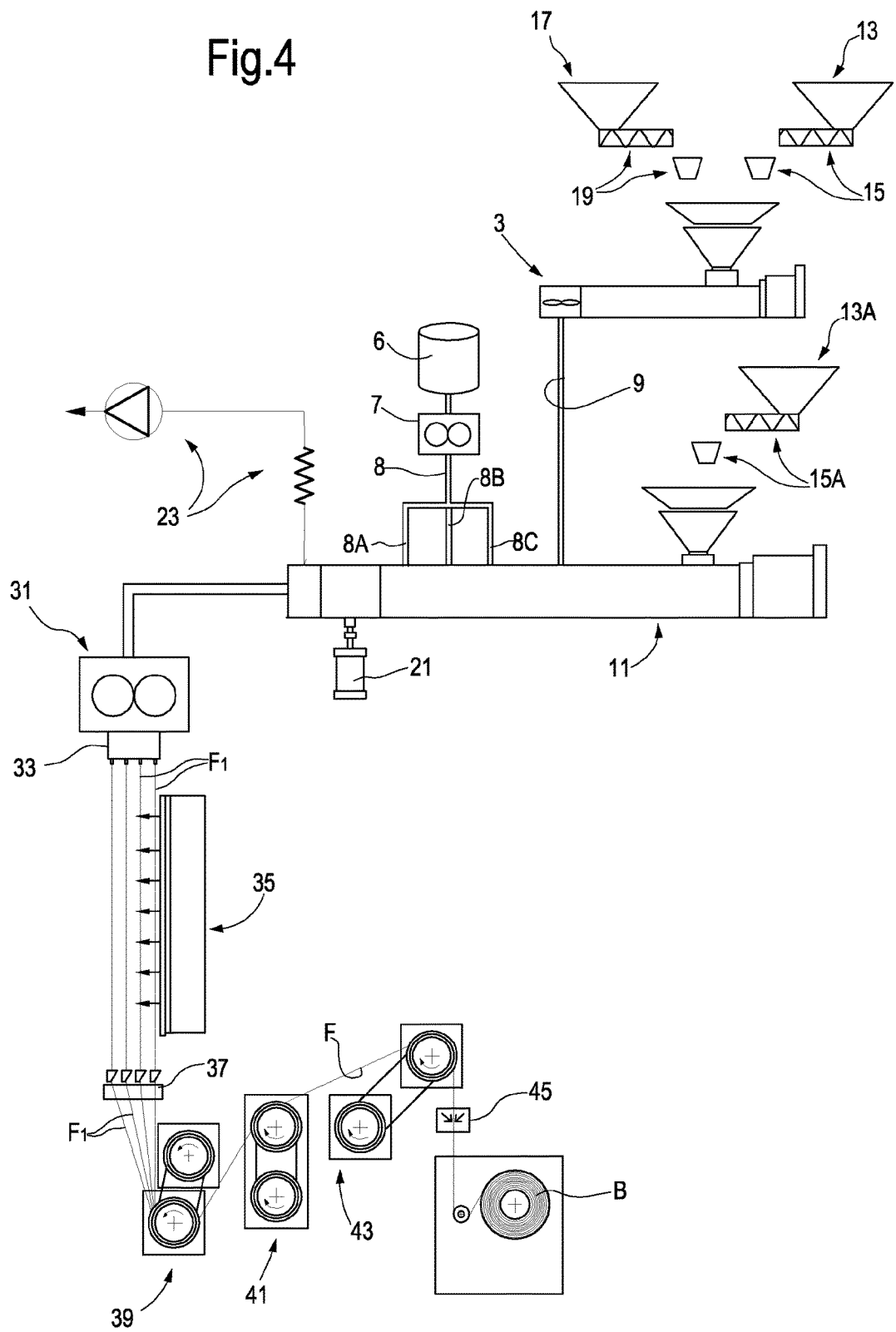

FIG. 4 shows a modified embodiment of a system for implementation of the method described herein. The same reference numbers indicate the same or equivalent parts to those illustrated with reference to FIGS. 1 and 3. Also in this case a first extruder 3 and a second extruder 11 are arranged in sequence or in cascade. With the first extruder 3 there can be associated a first container 13 of polyamide that can be metered via a metering device 15 to the extruder 3. The polyamide can be in granular form.

With the extruder 3 there can also be associated a container of a chain extender, a grafter or other additive that can be metered via a metering device 19 together with the polyamide of the container 13 or in a different point, for example downstream of the feed-in point of the polyamide coming from the tank 13 or upstream thereof, according to the specific operating conditions and technical design choices.

A connection line 9 between the first extruder 3 and the second extruder 11 conveys the molten polymer coming from the first extruder 3 to the second extruder 11. If required, a further tank or container 13A of polyamide can be associated with this latter. A metering device 15A meters, for example into a hopper, the second polyamide coming from the container 13A. The polyamide can be in granular form.

In this exemplary embodiment, just as in other forms of implementation of the method and of the system described herein, in which two extruders are provided in series, the polyamide fed to the first extruder 3 and the polyamide fed to the second extruder 11 can differ from one another by one or more characteristics or properties, for example they can have a different density or a different molecular weight, a different number of amine groups and carboxyl groups, a different viscosity, etc.

In some embodiments the polyamide of the container 13A is fed upstream with respect to the injection point of the molten polymer coming from the first extruder 3. The molten material coming from the first extruder 3 via the line 9 can be injected in a single point or in a plurality of positions spaced apart from one another. In some embodiments the molten material coming from the first extruder 3 can be fed into the second extruder 11 in a plurality of feed-in points, some upstream and others downstream with respect to the feed point of the polyamide coming from the container 13A.

In possible embodiments the polyetheramine contained in the container or tank 6 can be fed to the second extruder 11 through the line 8 in one or more positions, for example three positions indicated with 8A, 8B and 8C, preferably downstream of the injection point of the molten polymer coming from the first extruder 3. In other embodiments, not shown, the polyetheramine can be fed to the first extruder 3.

The system can also comprise components similar to those already described with reference to the preceding figures, marked in FIG. 4 with the same reference numbers, and not described.

Figure 5:
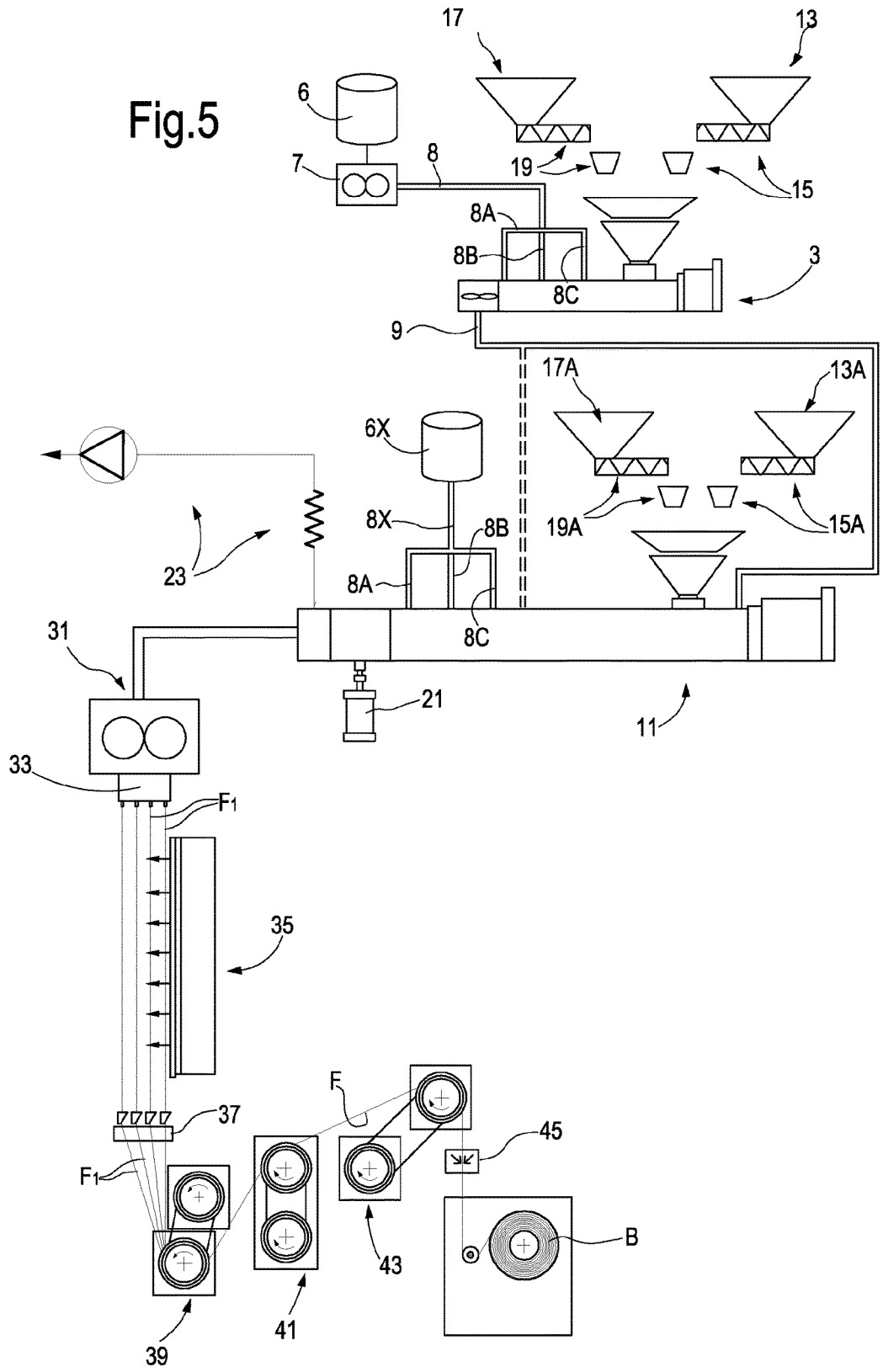

FIG. 5 illustrates a further embodiment of a system for implementation of the method described herein. The same reference numbers indicate the same or equivalent parts to those illustrated in the preceding figures.

In FIG. 5 there are provided a first extruder 3 and a second extruder 11. With the first extruder 3 a first container 13 for a polyamide can be associated, for example in granular form, which can be metered, for example, via a metering device 15. In a separate position or in the same feed-in position of the polyamide coming from the container 13, there can be fed into the extruder 3 a grafter or a chain extender or other equivalent additive contained in a container or tank 17 and metered, for example, via a metering device 19. In some embodiments there can be provided a first container or tank of polyetheramine 6 connected via a line 8 to the extruder 3, into which the polyetheramine is fed in a plurality of positions 8A, 8B, 8C or alternatively in a single position.

The polymer coming from the first extruder 3 can be fed to the second extruder 11 via a line 9. This can be connected to the extruder 11 in a position further upstream (solid line) or in a position further downstream (dashed line indicated with 9X) or in a plurality of positions. Container 17A, for a further additive, and container 13A, for a further polyamide, with respective metering devices 15A and 19A can be associated with the second extruder 11. The feed-in points of the polyamide coming from the tank 13A and of the additive coming from the container 17A can be coincident or spaced apart. Moreover, the feed-in points of the polyamide coming from the container 13A and of the additive coming from the container 17A can be upstream and/or downstream of the feed-in point or points of the polymer coming from the first extruder 3.

In some embodiments a second polyetheramine container 6X can also be provided, connected via a line 8X to the second extruder 11, into which the polyetheramine coming from the tank 6X can be fed in a single position or in a plurality of distinct positions, as indicated schematically with 8A, 8B, 8C in FIG. 5.

Also in the system of FIG. 5, further components are associated with the extruder 11, the same as or equivalent to the components already described with reference to the preceding figures, indicated with the same reference numbers and not described again.

In other embodiments the polyamide modified through reaction with polyetheramine can be obtained, for example in granular form, in a process which is separate from the extrusion process. In this case, polyamide and polyetheramine are contacted in a container at suitable temperature and pressure, with or without a compatibilizer, such as a suitable grafter or a chain extender. The reactions, described below, between the components placed in the container cause substitution of carboxyl groups of the polyamide with polyetheramine molecules. The final product is converted into granules. Subsequently, the granules are fed into an extruder for production of the yarn. In some embodiments, in the extrusion step further components or additives can be added to modify the physical, chemical or rheological characteristics of the polymer.

In other embodiments, the polyamide and the polyetheramine (with or without an additive such as a grafter or a chain extender, to facilitate the reaction) can be contacted in a separate container with respect to the extruder, reacted to obtain the modified polyamide in molten state and this latter can be fed directly to the extruder.

Figure 6:
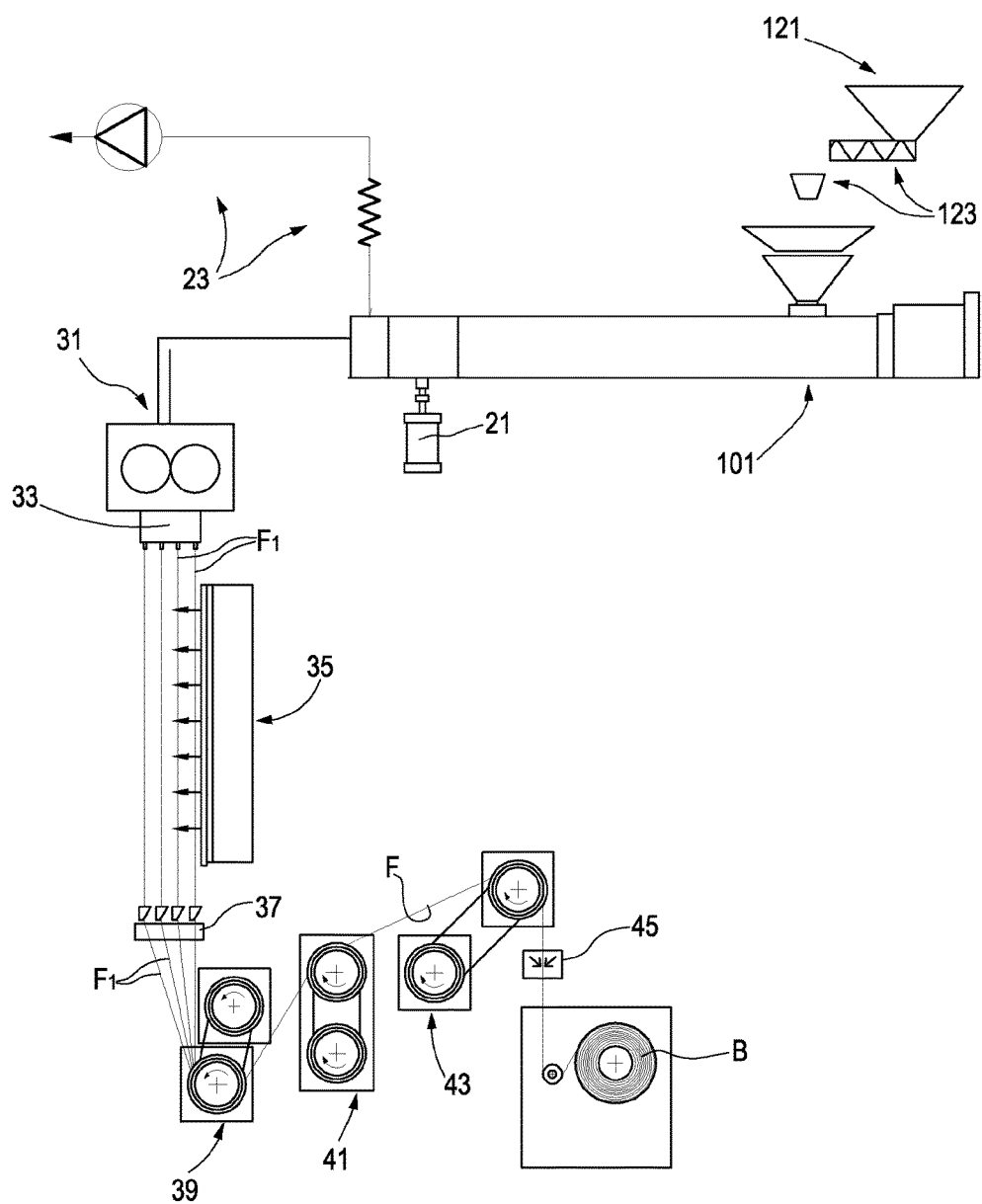

FIG. 6 shows an embodiment of a system for implementing the method described herein, wherein a single extruder 101 is used, similarly to the embodiment of FIG. 2, into which a polyamide modified with polyetheramine is fed.

In some embodiments, a container 121 with a metering device 123 are associated with the extruder 101. The container 121 contains a polyamide modified through reaction with a polyetheramine. The modified polyamide of the container 121 can be in granular form and can have been obtained in a previous conversion step, for example in a tank at temperature and pressure at which a polyamide 6,6 or a polyamide 6 is reacted with a polyetheramine with or without grafter or other compatibilizing additive.

The polyamide in granular form coming from the container 121 metered into the extruder 101 is melted and extruded toward a pump 31 that feeds the spinneret 33 for producing filaments F1, which are then collected via the members shown in FIG. 6 and already described with reference to the preceding figures and indicated with the same reference numbers.

In some embodiments other components can be fed to the extruder 101, either together or in separate positions, upstream or downstream of the modified polyamide coming from the tank 121.

In other embodiments the modified polyamide can be present in molten rather than granular form, for example if, instead of being a simple container from which the polyamide is delivered, the container 121 consists of a reaction tank in which the polyamide is contacted with the polyetheramine to react therewith, with or without a grafter or other suitable additive.

Example 1

Production of Polyamide 6,6 with the Addition of Polyetherdiamine of Formula (I).

For producing polyamide 6,6 with the addition of polyetherdiamine without the use of grafters or chain extenders, feeding the two components to the extruder, the following reaction is obtained in the extrusion step:

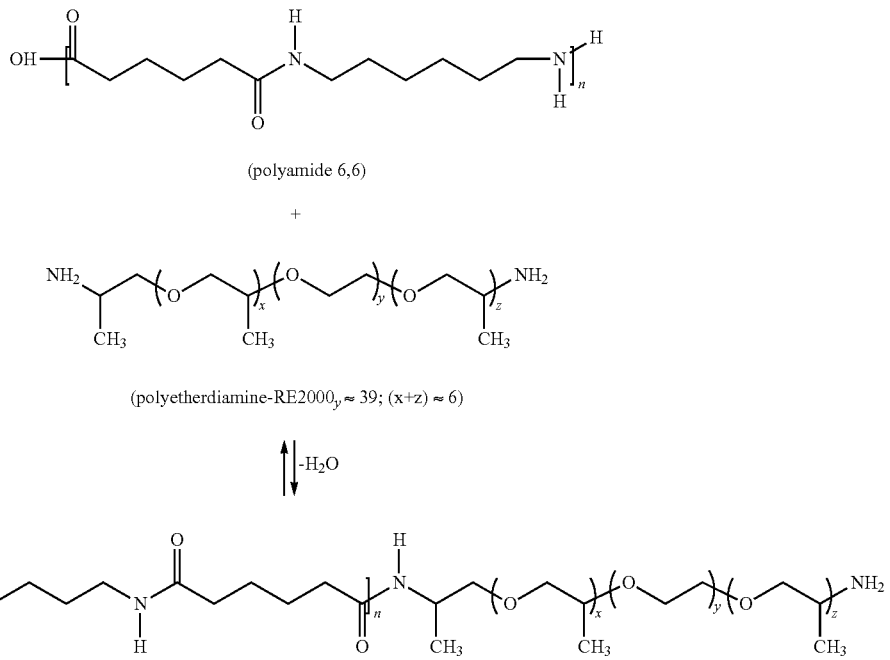

(polyamide 6,6)

+

(polyetherdiamine-RE2000, y ≈ 39; (x+z) ≈ 6)

−H₂O

Part of the carboxyl ends of the polyamide 6,6 bind with the amine end of the polyetherdiamine, releasing water and obtaining a modified polyamide.

Example 2

Production of Polyamide 6 with the Addition of Polyetherdiamine of Formula (I).

For producing polyamide 6 with the addition of polyetherdiamine without the use of grafters or chain extenders, feeding the two components to the extruder, the following reaction is obtained in the extrusion step

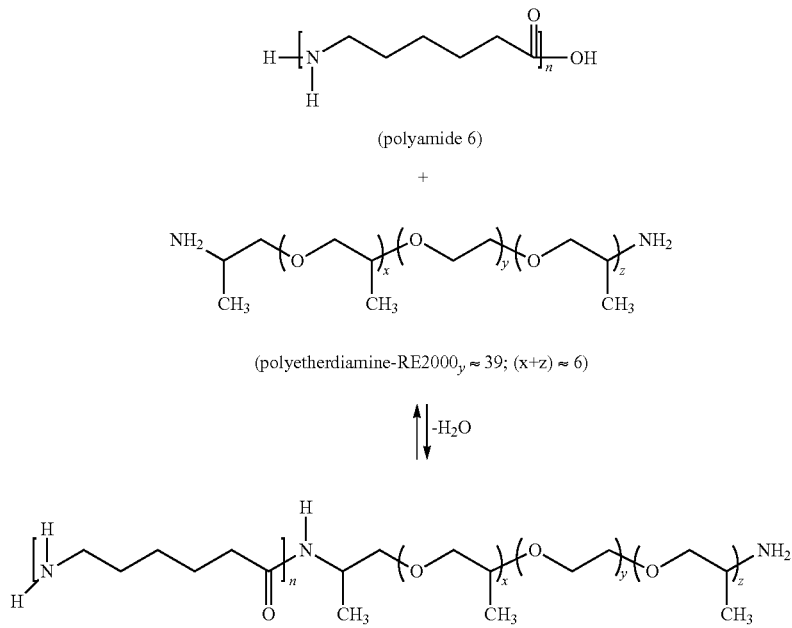

(polyamide 6)

+

(polyetherdiamine-RE2000, y ≈ 39; (x+z) ≈ 6)

−H₂O

Part of the carboxyl ends of the polyamide 6 bind with the amine end of the polyetherdiamine, releasing water and obtaining a modified polyamide 6.

Example 3

Production of Polyamide 6,6 Modified with Polyetherdiamine in the Presence of Chain Extender.

To facilitate the formation of polymer chains based on modified polyamide, using the system of FIG. 1 or FIG. 2, a chain extender or a grafter, which facilitates the formation of bonds between the polyetherdiamine molecules and the polyamide molecules, is added during the extrusion step. As chain extender a styrene-based copolymer can be used, such as a Joncryl FA11_010 chain extender by BASF Performance Chemical, of formula

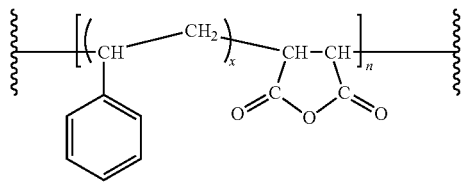

In a first step the chain extender reacts with the polyamide 6,6 according to the following reaction:

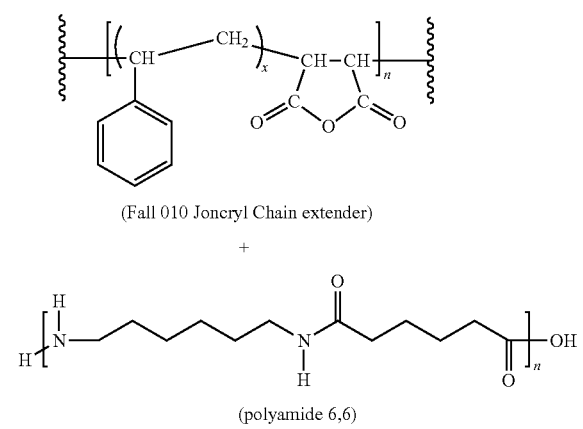

creating a molecule with two groups OH that can in turn react with respective polyetherdiamine molecules, forming the following reaction product releasing water:

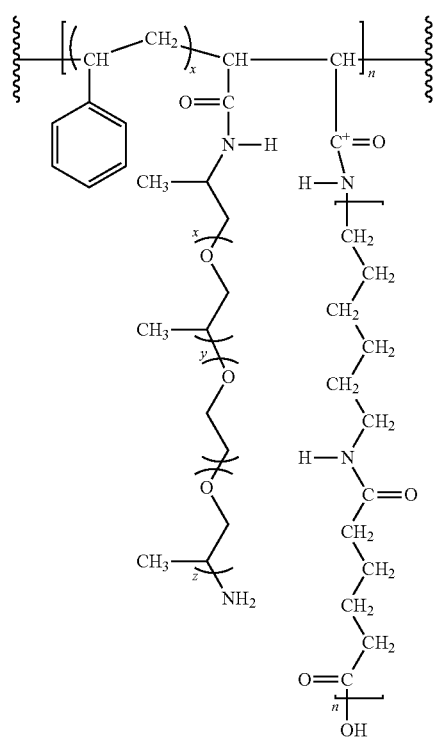

In other reaction modes, the chain extender reacts with the polyetherdiamine and the compound obtained subsequently reacts with the polyamide 6,6, giving rise to the modified polyamide as reaction product, according to the following sequence:

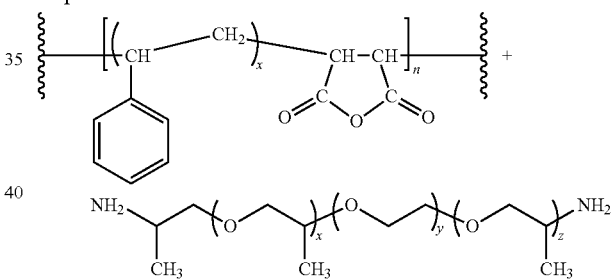

from which there is obtained

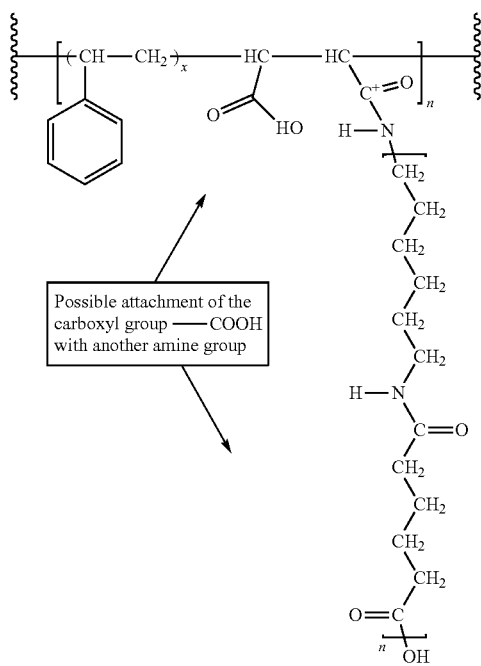
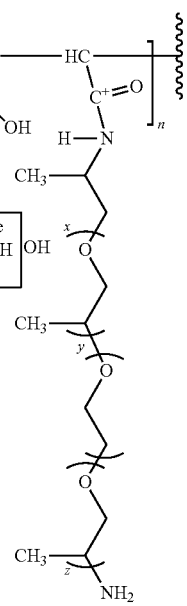

which reacting with the polyamide 6,6 generates the following reaction product together with water:

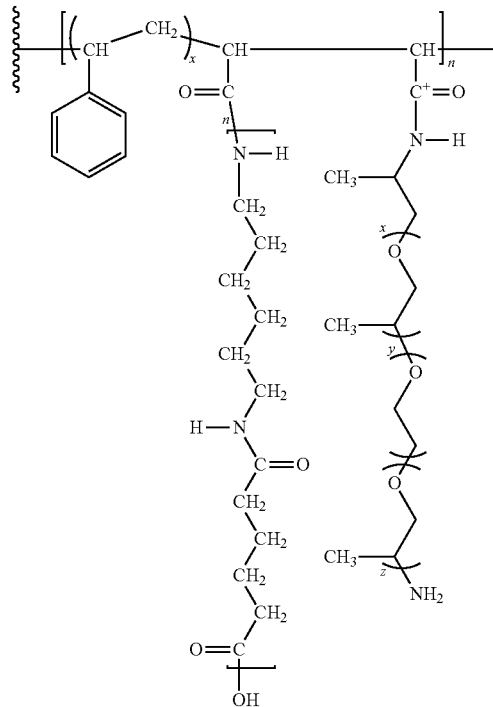

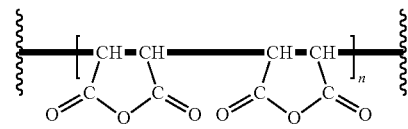

which gives rise to reactions similar to those indicated above with the formation of modified polyamide.

The following table summarizes the result of tests carried out on two reference samples (samples A and H) and on six samples of yarn obtained with the method of the present invention (samples B-G). More in particular, the sample A is a sample of polyamide 6,6 produced and distributed by Invista, having the following characteristics:

Molecular weight PA66: 14,000-15,000 UMA

Relative viscosity RV 2.49 (measured in sulfuric acid)

Amine NH2=45 (AEG) and carboxyl COOH=84.5 end groups

The sample H is a cotton yarn with a linear density 132 Ne (corresponding to a 44.7 dtex).

The samples B-G are obtained by the combination of:

Polyamide 6,6 Invista CE viscosity 2.49 in $H_2SO_4$, TEG 129.5 Polyetheramine: Elastamine RE2000 produced by Huntsman of formula (I)

Chain extender: Joncryl (BASF)

| Test N. | Polyamide 6,6 % by weight | RE2000 % by weight | Chain extender % by weight | dtex/ N. filaments | Relative viscosity measured in sulfuric acid 95.7% | Elongation % | Tenacity (cN/Tex) | Moisture Regain % at 16° C. 90% relative humidity |
|---|---|---|---|---|---|---|---|---|
| A | 100 | 0 | 0 | 56/40 | 2.48 | 73.0 | 38.0 | 5.42 |
| B | 96 | 4 | 0 | 56/40 | 2.7 | 69.1 | 36.2 | 6.69 |
| C | 92 | 8 | 0 | 56/40 | 2.16 | 66.2 | 33.8 | 11.04 |
| D | 88 | 12 | 0 | 56/40 | 2.03 | 64.1 | 31.7 | 13.15 |
| E | 91.5 | 8 | 0.5 | 56/40 | 2.10 | 71.0 | 27.0 | 10.88 |
| F | 91 | 8 | 1 | 56/40 | 2.03 | 103.0 | 17.0 | 11.42 |
| G | 87.5 | 12 | 0.5 | 56/40 | 1.95 | 67.0 | 26.0 | 13.16 |
| H | Cotton | | | 132 Ne (*) | | | | 10.16 |

(*) equivalent to 44.7 dtex.

In practice, both the reaction sequences can take place, with prevalence of the first or of the second depending upon the specific operating conditions. Test performed on multifilament yarns with the method described above have shown that the polyamide yarn modified with polyetheramine has a much higher moisture regain rate than a polyamide according to the current art, about the same as or even higher than a cotton yarn. The other relevant characteristics for textile processing are comparable to those of a conventional polyamide yarn.

The chain extender used can differ from the one indicated above purely by way of example. For example, in some embodiments the chain extender Joncryl 3400 produce by BASF can be used, having the following formula:

As can be observed from the table above, the yarns obtained with the method described herein (samples B, C, D, E, F, G) have a moisture regain, i.e. a capacity to absorb moisture, from slightly higher to much higher than a conventional polyamide 6,6 (sample A). The moisture absorption capacity increases as the amounts of polyetheramine added to the final polymer are increased and is substantially invariant with respect to the presence of chain extenders or grafters. With amounts of polyetheramine comprised between 8 and 12% by weight a moisture regain can be obtained that is more than twice, and in certain cases three times higher than the polyamide without polyetheramine. Already with an addition of 8% by weight of polyetheramine a moisture regain value comparable with or slightly higher than the natural cotton fiber is obtained (sample H). With larger amounts of polyetheramine the moisture regain is clearly better than in natural fiber (sample H). The moisture regain values indicated above were obtained with the following test:

total extraction of the yarn sample with petroleum ether (40-60° C.)
determination of the humidity using a manometer
cooling of the sample in anhydrous conditions for 15 minutes
implementation of the first weighing (W1)
conditioning for three hours at 16° C. and relative humidity at 90%
implementation of a second weighing (W2)

The degree of moisture regain is determined by the two values of the first weighing (W1) and of the second weighing of the sample:

M.R. %=[(W2−W1)/W1]*100

While particular embodiments of the invention have been described in the foregoing with reference to the accompanying drawings, those skilled in the art will understand that many modifications, changes and omissions are possible without materially departing from the innovative teachings, from the principles and from the concepts set forth above, and from the advantages of the subject matter defined in the appended claims. Therefore, the effective scope of the innovations described must be determined only on the basis of the widest interpretation of the appended claims, so as to comprise all modifications, changes and omissions. In addition, the order or sequence or any step of the method or process can be varied or rearranged according to alternative embodiments. Any reference numbers in the appended claims are provided to facilitate reading of the claims with reference to the description and to the drawing, and do not limit the scope of protection represented by the claims.

The invention claimed is:

1. A method for producing a polyamide-based synthetic yarn having a high moisture regain capacity, the method comprising the steps of:
reacting a polyamide and polytheramine having an average molecular weight of at least 1500 to obtain a modified polyamide containing polyetheramine to increase the moisture regain of the polyamide; and
generating a yarn from a molten mass of said modified polyamide, wherein the polyamide and the polyetheramine are contacted in a molten state, in the presence of an additive capable of reacting with the amine groups of the polyamide and with amine groups of the polyetheramine, in at least one extruder, wherefrom said modified polymer is fed to a spinneret for production of the yarn.

2. The method as claimed in claim 1, wherein said yarn has a yarn moisture regain between 6% and 15%.

3. The method as claimed in claim 1, wherein the polytheramine has an amine hydrogen equivalent weight (AHEW) that does not exceed by more than 10% the idealized AHEW for said polyetheramine, wherein a number of active amine hydrogens per molecule, and hence the AHEW is calculated by determining an amine group nitrogen content using the procedure described by the standard ISO 9702.

4. The method as claimed in claim 1, wherein said polyetheramine is a polyetherdiamine.

5. The method as claimed in claim 1, wherein said polyetheramine has a molecular weight equal to or greater than 2000.

6. The method as claimed in claim 1, wherein the polyamide is an aliphatic polyamide.

7. The method as claimed in claim 1, wherein said polyamide comprises nylon 6,6 and/or nylon 6.

8. The method as claimed in claim 1, wherein the polyetheramine is a polyetherdiamine having a formula

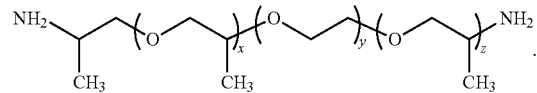

9. The method as claimed in claim 8, wherein the polyetherdiamine has a number of ethylene oxide molecules Lonipnscd between 30 and 45.

10. The method as claimed in claim 8, wherein said polyetherdiamine has a number of propylene oxide molecules between 5 and 8.

11. The method as claimed in claim 1, wherein said polyamide and said polyetheramine are contacted at a temperature between 220° and 350° C.

12. The method as claimed in claim 1, wherein said additive is a grafter and/or a chain extender.

13. The method as claimed in claim 1, wherein said polyamide has a number of amine end groups between 5 and 60 meq/kg.

14. The method as claimed in claim 1, wherein said polyamide has a number of carboxyl end groups between 40 and 200.

15. The method as claimed in claim 1, wherein said polyamide and said polyetheramine are contacted in molten state in at least two extruders arranged in cascade, and wherein the polymer exiting from a downstream one of said at least two extruders is fed to a spinneret for production of the yarn.

16. The method as claimed in claim 1, wherein the yarn has a dtex per filament (DPF) between 0.5 and 20.

17. The method as claimed in claim 1, wherein the polyamide has a molecular weight between 8,000 and 18,000 UMA.

18. The method as claimed in claim 1, wherein said yarn is a multi-component yarn, at least one of the components of the yarn being formed by said modified polyamide.

19. A yarn obtained by a process according to claim 1, further comprising at least one portion formed by a modified polyamide with polyetheramine having a molecular weight of at least 1500, at least some of the carboxyl groups of the polyamide being substituted by said polyetheramine.

20. The yarn as claimed in claim 19, wherein a percentage by weight of the polyetheramine is between 1% and 30%.

21. The yarn as claimed in claim 19, wherein the yarn has a moisture regain between 6% and 15%.

22. The yarn as claimed in claim 19, wherein the yarn comprises a multi-component structure, wherein at least one of the components comprises said modified polyamide, said at least one component forming at least a part of a surface of the yarn.

23. The yarn as claimed in claim 19, wherein the polyamide is an aliphatic polyamide.

24. The yarn as claimed in claim 19, wherein said polyamide comprises nylon 6 and/or nylon 6,6.

25. The yarn as claimed in claim 19, wherein the yarn has a dtex per filament (DPF) between 0.5 and 20.

26. The yarn as claimed in claim 19, wherein the polyetheramine is a polyetherdiamine having a formula

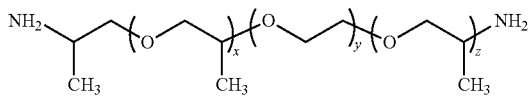

27. The yarn as claimed in claim 26, wherein a number of ethylene oxide molecules of the polyetherdiamine is between 30 and 45.

28. The yarn as claimed in claim 27, wherein a number of propylene oxide molecules is between 5 and 8.

29. A textile article produced with a yarn according to claim 19, or with fibers obtained from the yarn.

30. The method as claimed in claim 2, wherein said polyetheramine is a polyetherdiamine.

31. The method as claimed in claim 2, wherein said polyetheramine has a molecular weight equal to or greater than 2000.

32. The method as claimed in claim 3, wherein said polyetheramine has a molecular weight equal to or greater than 2000.

33. The method as claimed in claim 4, wherein said polyetheramine has a molecular weight equal to or greater than 2000.

34. The method as claimed in claim 2, wherein the polyamide is an aliphatic polyamide.

35. The method as claimed in claim 5, wherein said polyamide comprises nylon 6,6 and/or nylon 6.

36. The method as claimed in claim 9, wherein said polyetherdiamine has a number of propylene oxide molecules between 5 and 8.

37. The yarn as claimed in claim 20, wherein the yarn has a moisture regain between 6% and 15%.

38. The yarn as claimed in claim 20, wherein the yarn comprises a multi-component structure, wherein at least one of the components comprises said modified polyamide, said at least one component forming at least a part of a surface of the yarn.

39. The method as claimed in claim 8, wherein the polyetherdiamine has a number of ethylene oxide molecules of about 39.

40. The method as claimed in claim 8, wherein said polyetherdiamine has a number of propylene oxide molecules of about 6.

41. The method as claimed in claim 1, wherein said polyamide has a number of amine end groups between 5 and 35 meq/kg.

42. The method as claimed in claim 1, wherein said polyamide has a number of carboxyl end groups between 80 and 100 meq/kg.

43. The method as claimed in claim 1, wherein the polyamide has a molecular weight between 9,000 and 15,000 UMA.

44. The method as claimed in claim 1, wherein the polyamide has a molecular weight between 10,000 and 14,000 UMA.

45. The yarn as claimed in claim 19, wherein a percentage by weight of the polyetheramine is between 2% and 20%.

46. The yarn as claimed in claim 19, wherein a percentage by weight of the polyetheramine is between 5% and 15%.

47. The yarn as claimed in claim 19, wherein a percentage by weight of the polyetheramine is between 8% and 13%.

48. The yarn as claimed in claim 26, wherein a number of ethylene oxide molecules of the polyetherdiamine is about 39.

49. The yarn as claimed in claim 27, wherein a number of propylene oxide molecules is about 6.

50. The method as claimed in claim 9, wherein said polyetherdiamine has a number of propylene oxide molecules of about 6.

51. A method for producing a polyamide-based synthetic yarn having a high moisture regain capacity, the method comprising the steps of:

reacting a polyamide and polyetheramine having an average molecular weight of at least 1500 to obtain a modified polyamide containing polyetheramine, wherein the modified polyamide has at least some carboxyl groups substituted with polyetheramine to increase the moisture regain of the polyamide; and generating a yarn from a molten mass of said modified polyamide, wherein the polyamide and the polyetheramine are contacted in a molten state in at least one extruder, said modified polymer being fed from the at least one extruder to a spinneret for producing yarn.

* * * * *